(12) United States Patent
Iida

(10) Patent No.: US 8,115,998 B2
(45) Date of Patent: Feb. 14, 2012

(54) IN-LINE OPTICAL ISOLATOR

(75) Inventor: Junji Iida, Tokyo (JP)

(73) Assignee: SMM Precision Co., Ltd., Noshiro (JP)

( * ) Notice: Subject to any disclaimer, the term of this patent is extended or adjusted under 35 U.S.C. 154(b) by 0 days.

(21) Appl. No.: 12/885,820

(22) Filed: Sep. 20, 2010

(65) Prior Publication Data

US 2011/0069387 A1    Mar. 24, 2011

(30) Foreign Application Priority Data

Sep. 24, 2009  (JP) .................................. 2009-218769

(51) Int. Cl.
*G02B 5/30* (2006.01)
*G02B 6/00* (2006.01)
*G02B 27/28* (2006.01)

(52) U.S. Cl. .................. 359/484.03; 359/484.1; 385/11; 385/33; 372/703

(58) Field of Classification Search ............. 359/484.02, 359/484.03, 484.1; 385/11, 33; 372/703
See application file for complete search history.

(56) References Cited

U.S. PATENT DOCUMENTS

| | | | | |
|---|---|---|---|---|
| 5,315,431 A | * | 5/1994 | Masuda et al. ................ | 359/281 |
| 5,446,578 A | * | 8/1995 | Chang et al. .................. | 359/282 |
| 5,566,259 A | * | 10/1996 | Pan et al. ....................... | 385/11 |
| 5,631,771 A | * | 5/1997 | Swan ........................ | 359/484.03 |
| 5,642,447 A | * | 6/1997 | Pan et al. ....................... | 385/31 |
| 5,734,762 A | * | 3/1998 | Ho et al. ........................ | 385/11 |
| 5,796,889 A | * | 8/1998 | Xu et al. ........................ | 385/24 |
| 6,081,635 A | * | 6/2000 | Hehmann ....................... | 385/24 |
| 6,088,153 A | * | 7/2000 | Anthon et al. ............. | 359/341.32 |
| 6,711,310 B2 | * | 3/2004 | Chang et al. .................... | 385/11 |
| 7,259,913 B2 | * | 8/2007 | Iida ......................... | 359/484.03 |
| 2002/0186468 A1 | * | 12/2002 | Lee et al. ...................... | 359/484 |
| 2002/0191881 A1 | * | 12/2002 | Chen et al. ..................... | 385/11 |

FOREIGN PATENT DOCUMENTS

| | | |
|---|---|---|
| JP | 2005-43853 A1 | 2/2005 |
| JP | 2007-108344 A1 | 4/2007 |

\* cited by examiner

*Primary Examiner* — Ricky Shafer

(74) *Attorney, Agent, or Firm* — Kratz, Quintos & Hanson, LLP

(57) ABSTRACT

In an in-line optical isolator, a first polarization separation element 91, a Faraday rotator 6 made of a BIG film, and a second polarization separation element 92 are placed in that order. The isolator further includes a first optical fiber collimator 1*a* being placed at the forward-beam incident side of the first polarization separation element 91 and including a collimating lens 101 and a first optical fiber 31, and a second optical fiber collimator 2*a* being placed at the forward-beam exit side of the second polarization separation element 92 and including a collimating lens 102 and a second optical fiber 32 connected to a fiber amplifier. Also, an edge filter 100, which transmits light emitted from the first optical fiber 31 and having a wavelength equal to an oscillation wavelength and which reflects light emitted from the first optical fiber 31 and having wavelengths shorter than this wavelength, is placed between the second optical fiber collimator 2*a* and the second polarization separation element 92.

8 Claims, 2 Drawing Sheets

IN-LINE OPTICAL ISOLATOR

BACKGROUND OF THE INVENTION

1. Field of the Invention

The present invention relates to an in-line optical isolator used to cope with optical feedback in a high-power fiber laser which is used in laser processing and the like and has a wavelength near 1 μm (=1000 nm).

2. Description of the Prior Art

In a laser such as a semiconductor laser used in optical communication or a fiber laser used in laser processing and the like, when light reflected by optical surfaces or machined surfaces outside a laser resonator returns to a laser element of a semiconductor laser or a fiber laser, laser oscillation becomes unstable. Further, unstable laser oscillation may cause signal noise in the case of optical communication, and may cause a breakage of the laser element in the case of a material processing laser. Accordingly, for the prevention of the reflected optical feedback returning to the laser element, an optical isolator including a Faraday rotator, a polarization separation element, and the like is incorporated into a device including the laser element.

As a Faraday rotator used in an optical isolator for a high-power laser, a terbium gallium garnet single crystal (hereinafter referred to as TGG) or a terbium aluminum garnet single crystal (hereinafter referred to as TAG) has heretofore been used.

However, the TGG and TAG have small Faraday rotation coefficients per unit length. Accordingly, to obtain a polarization rotation angle of 45 degrees so that the TGG or TAG may function as an optical isolator, a long optical path length is needed. Thus, a crystal having a length of not less than 2 cm must be used. Moreover, to obtain a high optical isolation, a strong uniform magnetic field needs to be applied to the crystal, and thus a large and strong magnet is used. This increases the size of the optical isolator, and causes a problem in terms of size when the optical isolator is used in a device including a fiber laser (laser element) in which compact implementation is desired. Moreover, since the optical path length is long, the beam shape of a laser may become distorted in the crystal, and an optical system for correcting the distortion may be needed. Furthermore, since the TGG crystal, the magnet, and peripheral optical components are also expensive, a compact and inexpensive optical isolator has been demanded.

On the other hand, a Faraday rotator made of a bismuth-substituted rare-earth iron garnet crystal film (hereinafter also referred to as a BIG film), which is mainly used in the field of optical communication, has a Faraday rotation coefficient per unit length significantly larger than those of the TGG and TAG. Accordingly, an optical isolator can be greatly miniaturized. However, in a BIG film, in the case where the wavelength of light used is as short as approximately 1 μm (=1000 nm) such as used in a material processing laser, the following phenomenon is known to occur: iron ions strongly absorb the light, absorption further increases due to a temperature rise in the BIG film caused by the absorption, and this causes degradation in the performance of the BIG film.

As a method for solving the problem due to a temperature rise in the BIG film, a method has been proposed in which a temperature rise in the BIG film is prevented by bringing a sapphire heat sink substrate into contact with the BIG film (see Japanese Patent Application Publication Nos. 2005-043853 and 2007-108344).

In the case where an in-line optical isolator is incorporated into a device including a fiber laser used in laser processing and the like, the output side of the optical isolator may be connected to a fiber amplifier (including an optical fiber doped with a rare earth element such as Yb). In this case, the aforementioned optical feedback includes not only light having a wavelength equal to the oscillation wavelength but also amplified spontaneous emission light (referred to as ASE) from the Yb-doped fiber (fiber amplifier), and the power of the optical feedback may be as high as 50% or more for a forward input.

The ASE does not have a sharp wavelength spectrum like that of a laser, but has a wavelength distribution ranging from 1000 nm to 1100 nm with a peak between 1030 nm and 1040 nm. On the other hand, the BIG film shows strong absorption for wavelengths near 1 μm (=1000 nm) as described previously, and the amount of the absorption sharply increases when the wavelength decreases from 1100 nm to 1000 nm.

The BIG film shows strong absorption for wavelengths shorter than 1040 nm when ASE returns from the fiber amplifier to the optical isolator, due to the wavelength dependence of the absorption of the BIG film. This causes a temperature rise in the BIG film. Accordingly, there has been the problem that an increase in the forward insertion loss of the in-line optical isolator and the isolation degradation thereof occur.

The present invention has been made in view of such problems, and an object of the present invention is to provide an in-line optical isolator in which the insertion loss and isolation degradation are reduced even when ASE returns from the fiber amplifier.

SUMMARY OF THE INVENTION

Specifically, the present invention provides an in-line optical isolator including: a first polarization separation element, a Faraday rotator made of a bismuth-substituted rare-earth iron garnet crystal film, and a second polarization separation element, the first polarization separation element, the Faraday rotator, and the second polarization separation element being placed in that order along an optical axis; crystal heat sinks in contact with two opposite surfaces of the bismuth-substituted rare-earth iron garnet crystal film; a first optical fiber collimator which is placed at a forward-beam incident side of the first polarization separation element and which includes a collimating lens and a first optical fiber; a second optical fiber collimator which is placed at a forward-beam exit side of the second polarization separation element and which includes a collimating lens and a second optical fiber, the second optical fiber being connected to a fiber amplifier; and an edge filter placed between the second optical fiber collimator and the second polarization separation element in a way that a normal to a filter plane is inclined with respect to the optical axis, the edge filter transmitting light which is emitted from the first optical fiber and has a wavelength equal to an oscillation wavelength and reflecting light which is emitted from the first optical fiber and has wavelengths shorter than the oscillation wavelength.

According to the in-line optical isolator of the present invention, the edge filter is placed between the second optical fiber collimator and the second polarization separation element in a way that the normal to the filter plane is inclined with respect to the optical axis, the edge filter transmitting light which is emitted from the first optical fiber and has a wavelength equal to the oscillation wavelength and reflecting light which is emitted from the first optical fiber and has wavelengths shorter than the oscillation wavelength. For example, even in the case where a forward input to the optical isolator is not less than 1 W and where optical feedback to the optical isolator in the backward direction is not less than 1 W, a temperature rise due to absorption of light of the bismuth-substituted rare-earth iron garnet crystal film constituting the Faraday rotator is limited to approximately 20° C., and this makes it possible to ensure a value of isolation of not less than 25 dB.

DESCRIPTION OF THE PREFERRED EMBODIMENTS

Hereinafter, the present invention will be described in detail with reference to the drawings.

An in-line optical isolator according to the present invention has been invented in order to reduce an increase in insertion loss and maintain a high isolation by minimizing a temperature rise in a BIG film constituting a Faraday rotator even when ASE from a Yb-doped fiber (fiber amplifier) which has wavelengths ranging from 1000 nm to 1100 nm with a peak wavelength between 1030 nm and 1040 nm enters an optical isolator as optical feedback.

Figure 1:
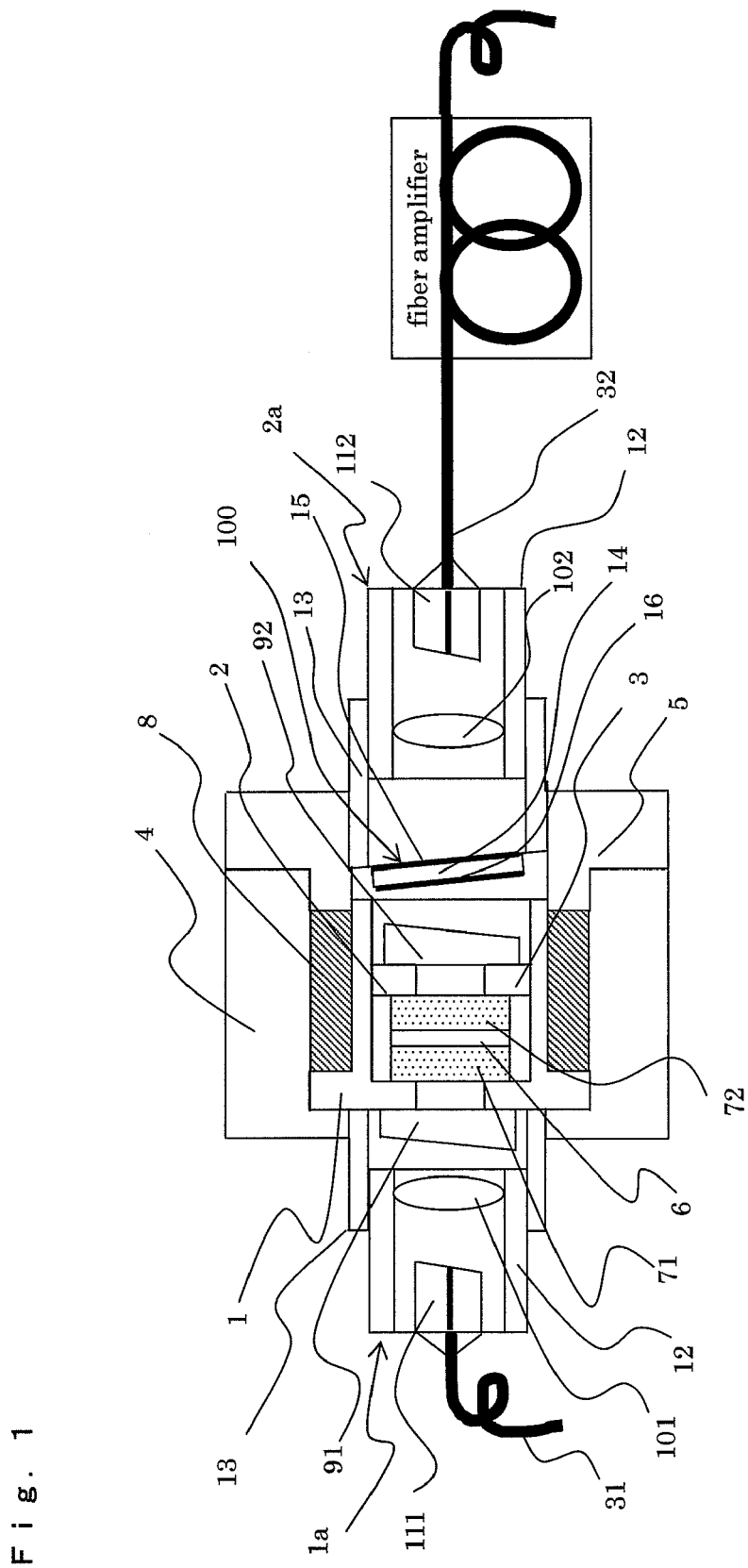
FIG. 1 is a view for explaining the configuration of an in-line optical isolator according to the present invention.

Specifically, as shown in FIG. 1, this in-line optical isolator includes a first polarization separation element 91 made of a wedge-shaped birefringent crystal plate, a Faraday rotator 6 made of a bismuth-substituted rare-earth iron garnet crystal film (BIG film), and a second polarization separation element 92 made of a wedge-shaped birefringent crystal plate, which are placed in that order along an optical axis. The in-line optical isolator further includes crystal heat sinks (sapphire substrates) 71 and 72 in contact with two opposite surfaces of the BIG film constituting the Faraday rotator 6, a first optical fiber collimator 1a which is placed at the forward-beam incident side of the first polarization separation element 91 and which includes a collimating lens 101 and a first optical fiber 31, and a second optical fiber collimator 2a which is placed at the forward-beam exit side of the second polarization separation element 92 and which includes a collimating lens 102 and a second optical fiber 32. The second optical fiber 32 is connected to a fiber amplifier (Yb-doped fiber). A feature of the in-line optical isolator is that it includes an edge filter 100 placed between the second optical fiber collimator 2a and the second polarization separation element 92 in a way that a normal to the filter plane is inclined with respect to the optical axis. The edge filter 100 transmits light emitted from the first optical fiber 31 and having wavelengths near an oscillation wavelength of 1.06 μm (=1060 nm), and reflects light emitted from the first optical fiber 31 and having wavelengths shorter than the oscillation wavelength as follows: the edge filter 100 reflects not less than 60% of light having wavelengths of not more than 1040 nm and not less than 90% of light having wavelengths of not more than 1030 nm.

The edge filter (filters having principal characteristics which sharply change between a blocked band and a transmitted band are generically referred to as edge filters) 100 includes a glass substrate 14, a dielectric multilayer film 15 vacuum deposited on at least one of two opposite surfaces of the glass substrate 14, and an antireflection coat (dielectric multilayer film) 16 for wavelengths around the oscillation wavelength which is formed on the other surface of the glass substrate 14.

It should be noted that in FIG. 1, reference numerals 1 to 5 denote metal holders for holding the optical isolator, reference numeral 8 denotes a ring magnet as a component of the optical isolator, reference numerals 12 denote stainless pipes as components of the first optical fiber collimator 1a and the second optical fiber collimator 2a, reference numerals 13 denote stainless pipes for connecting the first optical fiber collimator 1a and the second optical fiber collimator 2a to the optical isolator, and reference numerals 111 and 112 denote fiber pigtails.

In many cases, optical isolators for fiber lasers are required to have an isolation of not less than approximately 25 dB. To satisfy this requirement, the temperature rise in the BIG film as the Faraday rotator 6 needs to be limited to not more than approximately 20° C.

Further, satisfying such a condition for a forward input which is higher than 1 W to the optical isolator requires that the aforementioned crystal heat sinks (sapphire substrates) 71 and 72 having thermal conductivities of not less than 20 W/m·K be bonded to two opposite optical surfaces of the BIG film with an adhesive or by direct bonding or the like, and that optical surfaces of the crystal heat sinks (sapphire substrates) 71 and 72 which are exposed to air, except for a region through which a laser passes, be brought into contact with the aforementioned metal holders 1, 2, and the like having thermal conductivities of not less than 100 W/m·K.

Figure 2:
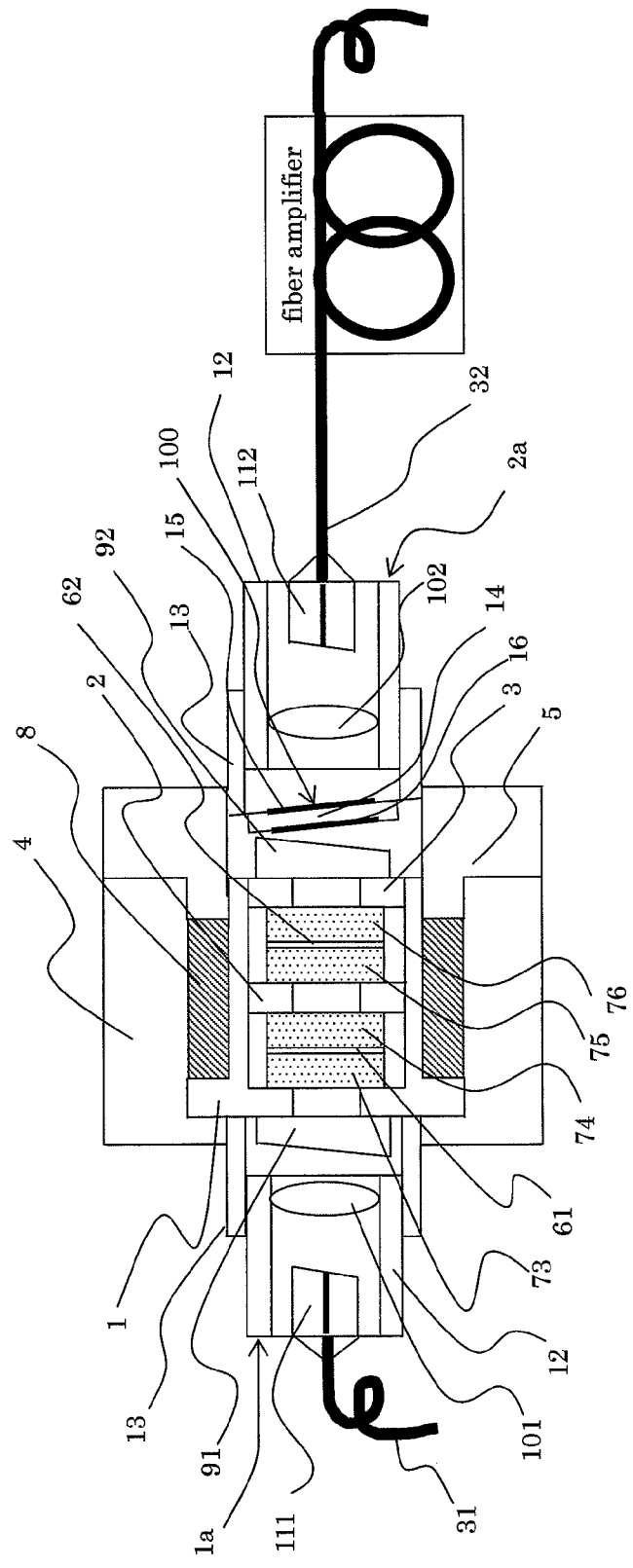
FIG. 2 is a view for explaining the configuration of an in-line optical isolator according to a modified example of the present invention.

Furthermore, for high powers in which a forward input to the optical isolator is higher than 5 W, since the above-described characteristic cannot be obtained using the BIG film shown in FIG. 1 which has a rotation angle of 45 degrees, two BIG films having a rotation angle of 22.5 degrees are used in combination as Faraday rotators 61 and 62, for example, as shown in FIG. 2. Specifically, as shown in FIG. 2, an optical isolator in which two BIG films are used in combination includes the first polarization separation element 91 made of a wedge-shaped birefringent crystal plate, the Faraday rotators 61 and 62 made of two bismuth-substituted rare-earth iron garnet crystal films (BIG films), and the second polarization separation element 92 made of a wedge-shaped birefringent crystal plate, which are placed in that order along the optical axis. The optical isolator further includes crystal heat sinks (sapphire substrates) 73, 74, 75, and 76 which are in contact with pairs of opposite surfaces of the BIG films constituting the Faraday rotators 61 and 62, respectively. It should be noted that in FIG. 2, the same components as those of the in-line optical isolator in FIG. 1 are denoted by the same reference numerals as in FIG. 1.

Further, in an actual fiber laser, the aforementioned ASE and light having a wavelength equal to the oscillation wavelength in the backward direction also return in addition to forward light. Wavelengths of the ASE spread over a very wide range with a peak between approximately 1030 nm and approximately 1040 nm. BIG films show extremely strong absorption of light having wavelengths near and shorter than this peak wavelength. Further, since the aforementioned edge filter 100 is provided, ASE having wavelengths in a wavelength region in which BIG films show strong absorption is reflected without reaching BIG films. On the other hand, ASE having wavelengths longer than the oscillation wavelength is weakly absorbed by BIG films by nature, and also has weak intensity because the wavelengths thereof are far from the peak wavelength of ASE, thus affecting BIG films little.

Moreover, when ASE reflected by the edge filter 100 re-enters the second optical fiber 32 connected to the fiber amplifier (Yb-doped fiber), amplification by the Yb-doped fiber may become unstable. Accordingly, by placing the edge filter 100 in a way that a normal to the filter plane is inclined with respect to the optical axis, an adjustment is made so that light reflected by the edge filter 100 may not enter the second optical fiber 32 connected to the fiber amplifier (Yb-doped fiber). In the case where the edge filter 100 is placed in a way that the normal to the filter plane is inclined with respect to the optical axis by an angle of not less than 1 degree and not more than 10 degrees, light reflected by the edge filter 100 is inclined with respect to a light beam of optical feedback by an angle of not less than 2 degrees and not more than 20 degrees, and therefore does not enter the core and clad of the fiber.

It should be noted that the in-line optical isolator shown in FIG. 1 has a structure in which only the second optical fiber 32 is connected to a fiber amplifier (Yb-doped fiber) but may have a structure in which the other optical fiber, i.e., the first optical fiber 31, is also connected to a fiber amplifier (Yb-doped fiber) that outputs light having a wavelength equal to the oscillation wavelength.

Hereinafter, the present invention will be specifically described using an example.

Example 1

The in-line optical isolator of the present invention shown in FIG. 1 was fabricated.

As a bismuth-substituted rare-earth iron garnet crystal film (BIG film) constituting the Faraday rotator 6, a crystal with a chemical formula of $(Yb_{0.7}Tb_{1.0}Bi_{1.3})Fe_5O_{12}$ was used.

Moreover, as the crystal heat sinks 71 and 72, sapphire substrates were used. Each of the sapphire substrates has a thickness of 0.5 mm, and has a c axis inclined with respect to a perpendicular to the substrate plane by approximately 3.5 degrees so that light obliquely emitted from wedge-shaped birefringent crystal plates (rutile crystal with a wedge angle of 5 degrees) placed at two opposite sides of the BIG film may enter the sapphire substrate parallel to the c axis. Also, a surface of each of the sapphire substrates which is exposed to air is coated with an antireflection coat made of a dielectric multilayer film (five-layer structure including $Ta_2O_5$ and $SiO_2$). Furthermore, a surface of each of the sapphire substrates which faces the BIG film is coated with approximately 130 nm of $Si_3N_4$ by PECVD (Plasma Enhanced CVD), and bonded to the BIG film without coating by direct bonding.

The sapphire-substrate/BIG-film/sapphire-substrate structure obtained by bonding is cut into a 2.6 mm square, fixed to and housed in the metal holders (copper holders) 1, 2, and 3 shown in FIG. 1 with an adhesive, and bonded to the metal holder 4 (20 mm square) made of copper with an epoxy resin.

At two opposite sides of the in-line optical isolator core fabricated as described above, single-mode fiber collimators (i.e., the first optical fiber collimator 1a and the second optical fiber collimator 2a) having a beam diameter of 0.8 mm were placed to face each other, and fixed to the stainless pipes 12 and 13 extending from the metal holder made of copper in which the optical isolator core is placed.

Moreover, as the edge filter 100, an edge filter was used which includes a quartz glass substrate 14, a dielectric multilayer film (multilayer structure obtained by stacking not less than 40 layers of $Ta_2O_5$ and $SiO_2$ to such a thickness that an effective optical path length of $\lambda/4$ may be obtained, even in consideration of refractive indices) 15 vacuum deposited on one surface of the quartz glass substrate 14, and an antireflection coat (multilayer structure obtained by stacking five layers of $Ta_2O_5$ and $SiO_2$ so that an effective optical path length of $\lambda/4$ may be obtained) 16 for wavelengths around the oscillation wavelength which is formed on the other surface of the quartz glass substrate 14. The edge filter does not reflect but transmits light having a wavelength of 1.06 μm (=1060 nm), which is equal to the oscillation wavelength of a fiber laser, and has a reflectance of not less than 60% for light having wavelengths of not more than 1040 nm and a reflectance of not less than 90% for light having wavelengths of not more than 1030 nm.

Further, as shown in FIG. 1, the edge filter 100 was placed to be fixed to the stainless 13 inclined by approximately 5 degrees.

When the in-line optical isolator fabricated as described above was applied to a fiber laser, stable characteristics were obtained.

POSSIBILITY OF INDUSTRIAL APPLICATION

In the in-line optical isolator of the present invention, even when amplified spontaneous emission (ASE) returns from a fiber amplifier connected to the output side of the optical isolator, insertion loss and isolation degradation are reduced by the action of the edge filter placed between the second optical fiber collimator and the second polarization separation element. Accordingly, the in-line optical isolator has an industrial applicability as an in-line optical isolator for a high-power laser.

What is claimed is:

1. An in-line optical isolator comprising:
   a first polarization separation element, a Faraday rotator made of a bismuth-substituted rare-earth iron garnet crystal film, and a second polarization separation element, the first polarization separation element, the Faraday rotator, and the second polarization separation element being placed in that order along an optical axis;
   crystal heat sinks in contact with two opposite surfaces of the bismuth-substituted rare-earth iron garnet crystal film;
   a first optical fiber collimator which is placed at a forward-beam incident side of the first polarization separation element and which includes a collimating lens and a first optical fiber;
   a second optical fiber collimator which is placed at a forward-beam exit side of the second polarization separation element and which includes a collimating lens and a second optical fiber, the second optical fiber being connected to a fiber amplifier; and
   an edge filter placed between the second optical fiber collimator and the second polarization separation element in a way that a normal to a filter plane is inclined with respect to the optical axis, the edge filter transmitting light which is emitted from the first optical fiber and has a wavelength equal to an oscillation wavelength and reflecting light which is emitted from the first optical fiber and has wavelengths shorter than the oscillation wavelength.

2. The in-line optical isolator according to claim 1, wherein the edge filter includes a quartz glass substrate, a dielectric multilayer film vacuum deposited on one surface of the quartz glass substrate, an antireflection coat for wavelengths around the oscillation wavelength formed on the other surface of the quartz glass substrate.

3. The in-line optical isolator according to claim 1, wherein the edge filter is placed in a way that the normal to the filter plane is inclined with respect to the optical axis by an angle of not less than 1 degree and not more than 10 degrees.

4. The in-line optical isolator according to claim 1, wherein the oscillation wavelength of light emitted from the first optical fiber is 1.06 μm (=1060 nm).

5. The in-line optical isolator according to claim 4, wherein a reflectance of the edge filter for light having wavelengths of not more than 1040 nm is not less than 60%.

6. The in-line optical isolator according to claim 4, wherein a reflectance of the edge filter for light having wavelengths of not more than 1030 nm is not less than 90%.

7. The in-line optical isolator according to claim 1, wherein the Faraday rotator is constituted of one Faraday rotator formed of a bismuth-substituted rare-earth iron garnet crystal film having a rotation angle of 45 degrees.

8. The in-line optical isolator according to claim 1, wherein the Faraday rotator is constituted of two Faraday rotators each formed of a bismuth-substituted rare-earth iron garnet crystal film having a rotation angle of 22.5 degrees.

* * * * *